US009760783B2

(12) United States Patent
Xu et al.

(10) Patent No.: US 9,760,783 B2
(45) Date of Patent: Sep. 12, 2017

(54) VEHICLE OCCUPANCY DETECTION USING PASSENGER TO DRIVER FEATURE DISTANCE

(71) Applicant: Xerox Corporation, Norwalk, CT (US)

(72) Inventors: Beilei Xu, Penfield, NY (US); Peter Paul, Penfield, NY (US); Florent Perronnin, Domene (FR)

(73) Assignee: Conduent Business Services, LLC, Dallas, TX (US)

( * ) Notice: Subject to any disclaimer, the term of this patent is extended or adjusted under 35 U.S.C. 154(b) by 581 days.

(21) Appl. No.: 14/273,774

(22) Filed: May 9, 2014

(65) Prior Publication Data

US 2015/0324653 A1    Nov. 12, 2015

(51) Int. Cl.
  *G06K 9/00* (2006.01)
  *B60R 1/00* (2006.01)
  *G08G 1/04* (2006.01)

(52) U.S. Cl.
  CPC ............ *G06K 9/00838* (2013.01); *B60R 1/00* (2013.01); *G08G 1/04* (2013.01)

(58) Field of Classification Search
  CPC .. B06R 1/00; G06K 9/00838; G06K 9/00362; G06K 9/2018
  USPC ........................................................ 348/148
  See application file for complete search history.

(56) References Cited

U.S. PATENT DOCUMENTS

| | | | |
|---|---|---|---|
| 5,801,763 A | 9/1998 | Suzuki | |
| 6,553,296 B2 | 4/2003 | Breed et al. | |
| 6,718,049 B2* | 4/2004 | Pavlidis | G06K 9/00228 348/164 |
| 7,477,758 B2 | 1/2009 | Piirainen et al. | |
| 7,570,785 B2 | 8/2009 | Breed | |
| 7,786,897 B2* | 8/2010 | Alves | G08G 1/0175 340/905 |
| 7,898,402 B2 | 3/2011 | Odate et al. | |
| 8,054,203 B2 | 11/2011 | Breed et al. | |
| 8,560,179 B2* | 10/2013 | Basir | B60N 2/002 382/181 |
| 8,611,608 B2 | 12/2013 | Fan et al. | |
| 8,860,784 B2* | 10/2014 | Kobayashi | H04N 13/0422 348/43 |
| 9,239,948 B2* | 1/2016 | Sudha | G06K 9/00302 |

(Continued)

OTHER PUBLICATIONS

Perronnin, F. et al., "Fisher Kernels on Visual Vocabularies for Image Categorization:" IEEE Conference on Computer Vision and Pattern Recognition Jun. 17-22, 2007, Minneapolis, MN, pp. 1-8.

(Continued)

*Primary Examiner* — Mohammed Rahaman
*Assistant Examiner* — Joseph Becker
(74) *Attorney, Agent, or Firm* — Kevin Soules; Luis M. Ortiz; Kermit D. Lopez (57) ABSTRACT

A method, system, and apparatus for vehicle occupancy detection comprises collecting image data of a vehicle, creating a first value according to a plurality of characteristics of a driver position of the vehicle, and then creating at least one other value according to a plurality of characteristics of at least one other candidate occupant position in the vehicle. The characteristics of the driver position of the vehicle and candidate occupant position of the vehicle are compared in order to determine the vehicle occupancy.

17 Claims, 8 Drawing Sheets

(56) References Cited

U.S. PATENT DOCUMENTS 9,449,221 B2 * 9/2016 Gunjan .............. G06K 9/00362

OTHER PUBLICATIONS

Perronnin, F. et al., "Improving the Fisher Kernel for Large-Scale Image Ciassffication," Computer Vision—EECV 2010, Lecture Notes in Computer Science (2010) 6314:143-156.

* cited by examiner

VEHICLE OCCUPANCY DETECTION USING PASSENGER TO DRIVER FEATURE DISTANCE

FIELD OF THE INVENTION

Embodiments are generally related to the field of video-based detection. Embodiments are also related to methods and systems for video-based vehicle detection. Embodiments are further related to methods and systems for detecting vehicle occupancy using passenger to driver feature distance.

BACKGROUND

Occupancy detection is an important component in the automated video analytics field. In video based on-street applications, cameras are often installed to monitor vehicles. One application for such cameras is to monitor High Occupancy Vehicle (HOV) highway lanes. HOV lanes require a minimum number of passengers riding in the vehicle in order to be eligible to use the lane. More recently High Occupancy Tolling (HOT) applications have been developed. HOT lanes determine the toll amount according to the number of occupants in the vehicle. HOV/HOT lane requirements are used as a means for reducing congestion in high traffic locations. The fee associated with using HOV/HOT lanes can be adjusted to preserve vehicle speed in the lane.

It has been observed that violation rates of occupancy requirements associated with HOV and HOT lanes are often significant. The current method for HOV/HOT enforcement is limited to visual inspection performed by police officers at roadside. Visual inspection has a number of drawbacks; it is expensive, difficult, and generally ineffective. Published studies indicate that less than 10% of HOV violators are caught and ticketed through visual enforcement. It is dangerous for police officers to pursue HOV/HOT violators at high speed in congested highway traffic. Furthermore, visual inspection can be compromised by inclement weather. Therefore, a need exists for automated enforcement methods and systems.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for object detection.

It is another aspect of the disclosed embodiments to provide a method and system for video based vehicle occupancy detection.

It is yet another aspect of the disclosed embodiments to provide an enhanced method and system for robust and computationally efficient, real-time vehicle occupancy detection, using passenger to driver feature distance.

The aforementioned aspects and other objectives and advantages can now be achieved as described herein. A method and system for vehicle occupancy detection comprises collecting image data of a vehicle, creating a first value according to a plurality of characteristics of a driver position of the vehicle, creating at least one other value according to a plurality of characteristics of at least one other candidate occupant position in the vehicle, and comparing the first value to the at least one other value in order to determine a vehicle occupancy. Collecting image data of a vehicle further comprises localizing the image data of the vehicle in order to define a localized windshield region and splitting the localized windshield region into a driver part and a passenger part.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
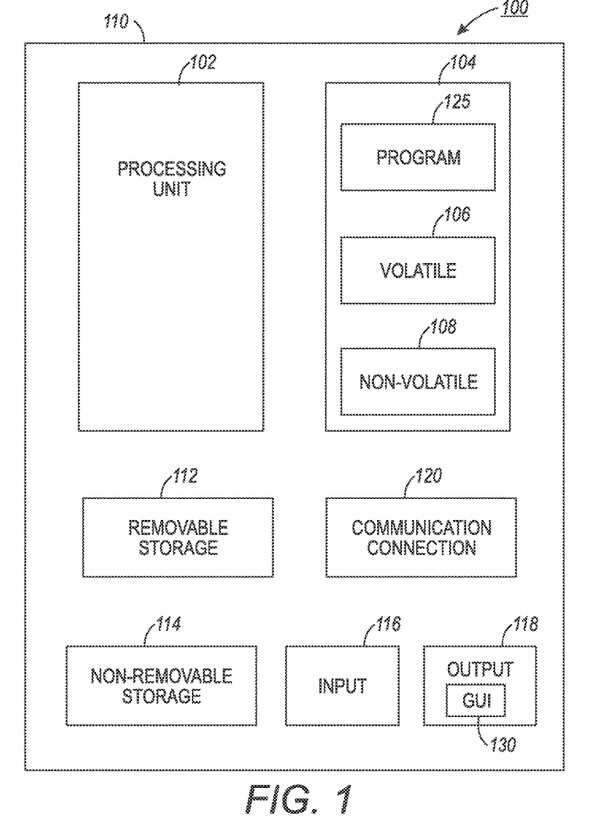
FIG. 1 depicts a block diagram of a computer system which is implemented in accordance with the disclosed embodiments.
Figure 2:
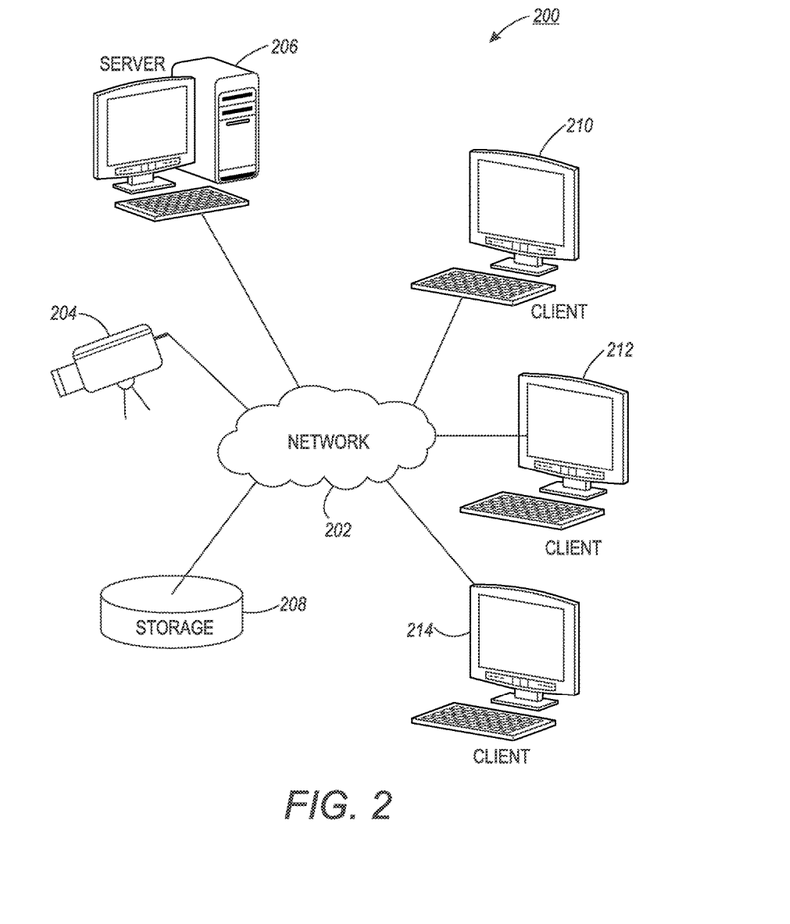
FIG. 2 depicts a graphical representation of a network of data-processing devices in which aspects of the present invention may be implemented.
Figure 3:
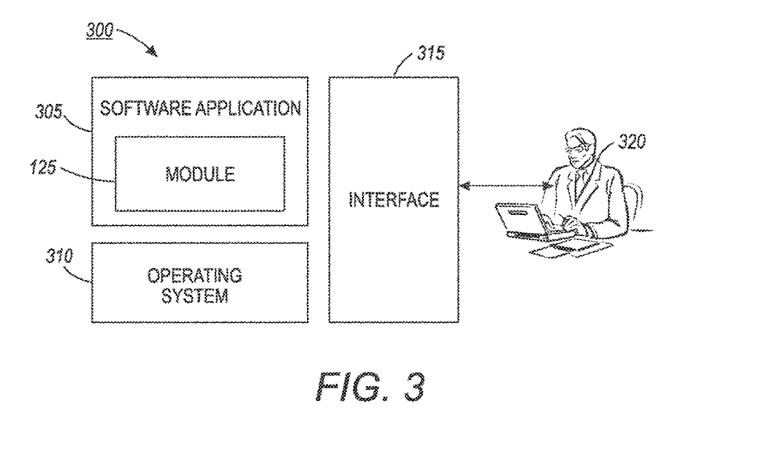
FIG. 3 illustrates a computer software system for directing the operation of the data-processing system depicted in FIG. 1, in accordance with an example embodiment.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing the methods and systems disclosed herein is shown in FIG. 1. A general computing device in the form of a computer 110 may include a processing unit 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data, including data comprising frames of video.

Computer 110 may include or have access to a computing environment that includes input 116, output 118, and a communication connection 120. The computer may operate in a networked environment using a communication connection to connect to one or more remote computers or devices. The remote computer may include a personal computer (PC), server, router, network PC, a peer device or other common network node, or the like. The remote device may include a photographic camera, video camera, tracking device, or the like. The communication connection may include a Local Area Network (LAN), a Wide Area Network (WAN) or other networks. This functionality is described in more fully in the description associated with FIG. 2 below.

Output 118 is most commonly provided as a computer monitor, but may include any computer output device. Output 118 may also include a data collection apparatus associated with computer system 100, In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse, and/or with a keyboard. A particular item can function in the same manner to the user in all applications because the GUI provides standard software routines (e.g., module 125) to handle these elements and report the user's actions. The GUI can further be used to display the electronic service image frames as discussed below.

Computer-readable instructions, for example, program module 125, which can be representative of other modules described herein, are stored on a computer-readable medium and are executable by the processing unit 102 of computer 110. Program module 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers in which embodiments of the present invention may be implemented. Note that the system 200 can be implemented in the context of a software module such as program module 125. The system 200 includes a network 202 in communication with one or more clients 210, 212, and 214. Network 202 is a medium that can be used to provide communications links between various devices and computers connected together within a networked data processing system such as computer system 100. Network 202 may include connections such as wired communication links, wireless communication links, or fiber optic cables. Network 202 can further communicate with one or more servers 206, one or more external devices such as video camera 204, and a memory storage unit such as, for example, memory or database 208.

In the depicted example, video camera 204 and server 206 connect to network 202 along with storage unit 208. In addition, clients 210, 212, and 214 connect to network 202. These clients 210, 212, and 214 may be, for example, personal computers or network computers. Computer system 100 depicted in FIG. 1 can be, for example, a client such as client 210, 212, and/or 214. Alternatively clients 210, 212, and 214 may also be, for example, a photographic camera, video camera, tracking device, etc.

Computer system 100 can also be implemented as a server such as server 206, depending upon design considerations. In the depicted example, server 206 provides data such as boot files, operating system images, applications, and application updates to clients 210, 212, and 214, and/or to video camera 204. Clients 210, 212, and 214 and video camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a computer software system 300, which may be employed for directing the operation of the data-processing systems such as computer system 100 depicted in FIG. 1. Software application 305, may be stored in memory 104, on removable storage 112, or on non-removable storage 114 shown in FIG. 1, and generally includes and/or is associated with a kernel or operating system 310 and a shell or interface 315. One or more application programs, such as module(s) 125, may be "loaded" (i.e., transferred from removable storage 112 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, multi-processor systems, data networks, microprocessor-based or programmable consumer electronics, networked personal computers, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines, and an implementation, which is typically private (accessible only to that module) and which includes source code that actually implements the routines in the module. The term module may also simply refer to an application such as a computer program designed to assist in the performance of a specific task such as word processing, accounting, inventory management, etc.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of a data-processing system such as computer system 100, in conjunction with program module 125, and data-processing system 200 and network 202 depicted in FIGS. 1-2. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Macintosh, UNIX, LINUX, and the like. Therefore, the descriptions of the exemplary embodiments, which follow, are for purposes of illustration and not considered a limitation.

It is common in various applications for video cameras to capture video of a roadway. In some cases, this video is collected in order to determine the occupancy of the vehicle in High Occupancy Vehicle ("HOV") and High Occupancy Tolling ("HOT") applications. The present invention takes advantage of feature-based passenger-to-driver distances to detect the number of occupants in a vehicle. Such methods and systems are particularly valuable in situations where visual enforcement is ineffective or unsafe. This includes scenarios that might involve parking lots, to stations, roads, highways, interstates, stop-and-go traffic scenarios, entrances and exits to an environment, pedestrian traffic thoroughfares, intersections, bridges, tunnels, HOV traffic lanes, HOT traffic lanes, and the like.

Figure 4:
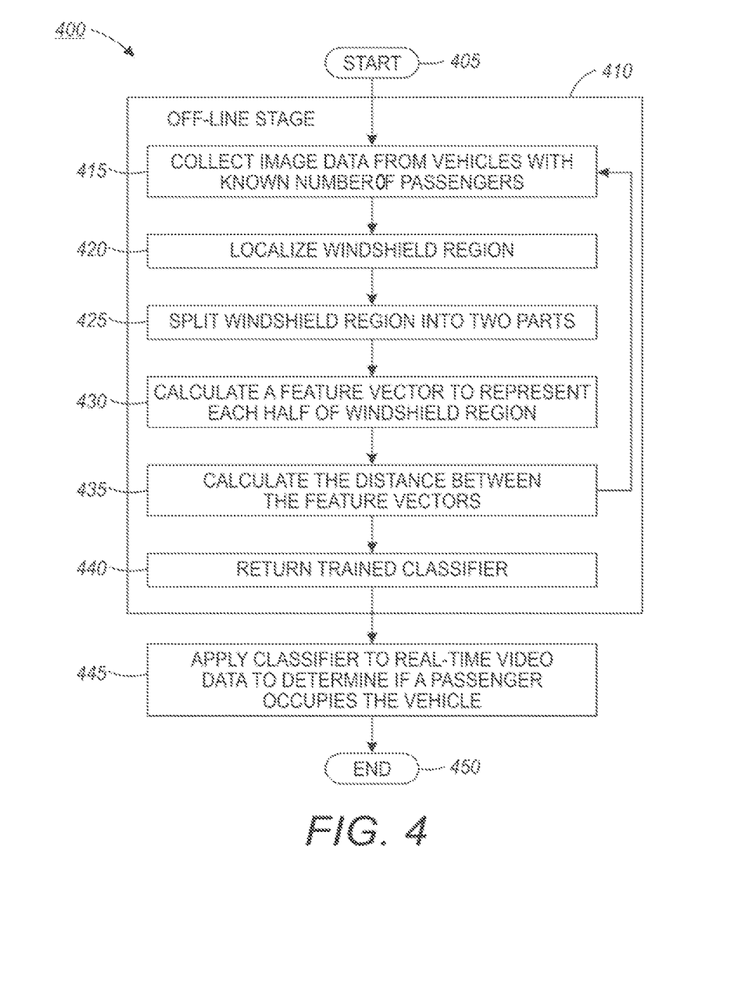
FIG. 4 depicts a flow chart illustrating logical operational steps for determining vehicle occupancy in accordance with the disclosed embodiments.

FIG. 4 illustrates a high level flow chart 400 of logical operational steps associated with methods and systems for determining vehicle occupancy. The method begins at step 405.

In general, method 400 includes an offline stage 410 where a classifier is trained. The phrase "Off-line" as used herein means that the step or steps described are not processed in real-time and can be performed in preparation for steps that can be performed in real-time. In off-line stage 410, a classifier associated with a computer system such as computer system 100 can be trained to identify a distance between features as indicative of the presence or absence of a passenger in a vehicle. Step 410 can include a number of sub-steps involved in training a classifier which can include defining a region of interest, collecting a set of images of the region of interest under various weather conditions, illumination characteristics, times of day, etc., clustering such images into groups indicative of those conditions, and then training one or more classifiers for each group of training images. It should be appreciated that, alternatively one classifier can be trained for all the images embodying the varying conditions.

Figure 8:
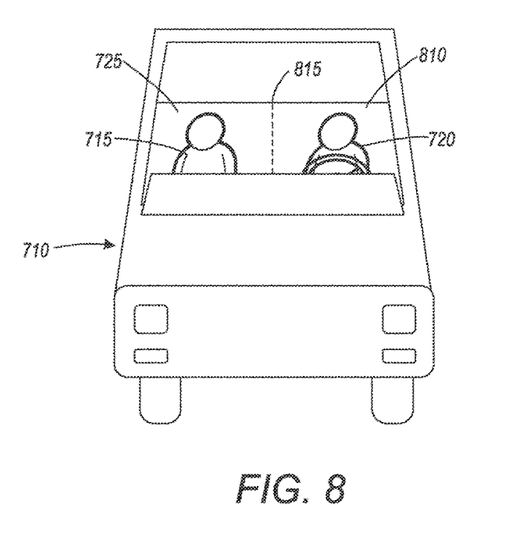
FIG. 8 depicts a frontal view of a vehicle windshield in accordance with aspects of the disclosed embodiments.

Specifically, at step 415 image data can be collected from vehicles with or without a passenger. This image data is processed at step 420 where the windshield region of the vehicle in the image data is localized and then split into two parts at step 425. The two regions of the windshield can be thought of as a passenger side and a driver side of the windshield. FIG. 8 illustrates an exploded frontal view of a vehicle 710. The vehicle windshield 725 is shown split along dividing line 815 into driver side 810, occupied by driver 720, and passenger side occupied by passenger 715. In one embodiment, one of the sides can be right-left flipped in order to compensate for any disparities between the passenger and driver side.

Next, a feature representation or feature vector can be calculated for both sides of the localized windshield as shown at step 430. The distance between these two feature vectors is determined at step 435. The steps can then be repeated as necessary until a classifier has been trained, as shown at step 440.

Now the trained classifier is ready for deployment in a real-time traffic scenario as illustrated at step 445. Generally, step 445 may include a number of sub-steps. For example, at this point a camera can be disposed in a real traffic environment, preferably positioned to collect video data of vehicles in a HOV or HOT lane from a front vantage. Data from the camera can be provided to a computer system such as computer system 100, wherein, as above, the windshield of passing vehicles can be collected, localized, and split. A feature vector for each side of the vehicles can be calculated and the distance between those feature vectors calculated. The calculated distance is then classified using the classifier as either indicative of a passenger in the vehicle, or not indicative of a passenger in the vehicle.

At this point, the results of the classifier can be provided to a ticketing authority, tolling authority, or other such agency, for review. For example, if the classifier indicates that the image of the vehicle suggests the vehicle did not have a passenger but was travelling in the HOV lane, the video data can be provided to the ticketing authority. The ticketing or tolling authority can then review the data and issue a ticket if necessary. Alternatively, a ticket may be issued automatically, if desired. The method ends at step 450.

Figure 5:
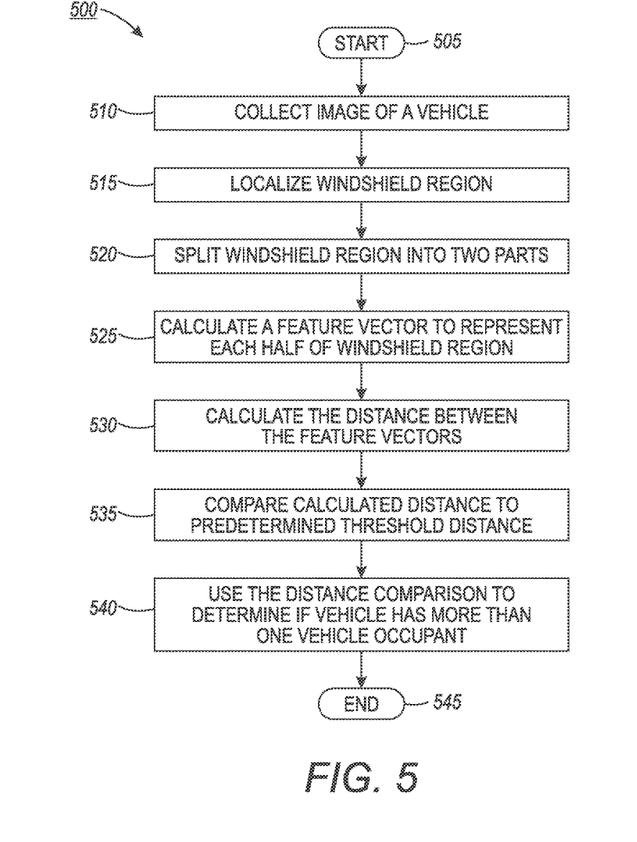
FIG. 5 depicts a flow chart illustrating alternative logical operational steps for determining vehicle occupancy in accordance with the disclosed embodiments.

In another embodiment, a method 500 for determining the occupancy of a vehicle is illustrated in FIG. 5. The method begins at step 505. Unlike the method illustrated in FIG. 4 above, the method 500 can be implemented at or near real time. This method relies on a predetermined threshold distance as a marker for whether or not the vehicle is occupied by more than one person.

At step 510, images of a vehicle can be collected. The vehicle images are preferably collected from a earners operating in the near infrared range, although other still or video collection devices may alternatively be used. The camera is preferably mounted on an overhead gantry or a support on the side of the target road or highway. The camera can be trained on the oncoming traffic head on. The camera can be triggered to begin collecting data using any of a number of known triggering means. The trigger should be configured to begin capturing data so that the location of the vehicle corresponds with a distance for best data quality capture by the camera.

To reduce computational cost and improve detection accuracy, the windshield region is extracted through image processing methods or machine-learning based object localization methods as shown at step 515 where the windshield region of the vehicle is localized. The extracted windshield region may be rectangular or a number of other non-rectangular shapes. By isolating the windshield region, detection methods can focus on the relevant differentiating characteristics between vehicles with a single passenger and vehicles with multiple passengers and not on extraneous features outside of the windshield area.

Next at step 520, the windshield region is spat into two parts, a driver side and a passenger side. FIG. 8 illustrates an exploded frontal view of a vehicle 710. The vehicle windshield 725 is shown split along dividing line 815 into driver side 810, occupied by driver 720, and passenger side occupied by passenger 715. Optionally, the driver and passenger sides can then be right-left flipped to compensate for disparities between the passenger and driver side. It is noteworthy that even with the windshield divided into two sections it is still impractical to directly compare the passenger and driver sides of the windshields because it is very difficult to account for noise factors in the images.

Thus, at step 525 an image feature representation is calculated for each half of the windshield. Calculating a feature representation can be accomplished with a series of sub-steps which include extracting a set of patches, computing a set of statistics from each of the patches, and aggregating the set of statistics from each of the patches into either an image-level representation, a region level representation, or both. In one embodiment, feature descriptors such as Successive Mean Quantization Transform ("SMQT") or Local-Binary-Patterns ("LBP") can be used to calculate feature vectors for each side of the windshield.

In cases where the windshield has been cropped, the feature representation should have less spatial dependency. For example, as described above multiple local descriptors can be aggregated into a sub-image level global descriptor. This could include the Bag-Of-Visual-Words representation or the Fisher Vector representation.

Once a feature representation vector for the two sides of the windshield has been determined, the distance between the respective vectors for the two sides can be calculated as illustrated at step 530. In order to do this, a distance/similarity metric has to be defined. Distance/similarity functions are at the core of numerous computer vision tasks. There are many existing distance/similarity functions such as Mahalanobis or as simple as Euclidean distances which can be used for calculating the distance between the respective feature vectors.

It should be appreciated that for purposes of example, the focus has been on one dimensional distance metrics; however, higher dimensional distance metrics, combinations of multiple distance metrics, or combinations of distance metrics from different feature descriptors could be similarly used. Furthermore, any metric learning methods can be used for establishing an appropriate distance/similarity functions for a given task.

The next step is to compare the calculated distance of step 530 to a predetermined threshold distance as shown at step 535. Key to this step is establishing a viable threshold value. For example, the threshold value may be established by implementing an off-line method 410 as illustrated in FIG. 4. Alternatively, the threshold method can be derived heuristically or through a simple cross-validation procedure as data is collected and processed for multiple vehicles.

The threshold value can also be determined by constructing a distance model using approaches such as a Gaussian Mixture Model. For example, a training data set can be collected and the results can be clustered into groups corresponding to violators (no passengers detected) and non-violators (passengers detected). The centers of each of the clusters are identified. The distance between all vehicles with passengers and vehicles without passengers from the training data, and each cluster center can then be calculated. A threshold can then be determined that separates violators from non-violators based on this distance metric.

Finally, at step 540, the distance comparison can be used to determine if the vehicle has more than one vehicle occupant. If the distance between the calculated feature representations for each side of the windshield exceeds the threshold, then the vehicle is determined to not have a passenger. If the comparison indicates that the image of the vehicle suggests that the vehicle did not have a passenger, but was travelling in the HOV lane, the video data can be provided to a ticketing or tolling authority. The ticketing or tolling authority can then review the data and issue a ticket if necessary. Alternatively a ticket may be issued automatically, if desired. The method ends at step 545.

Figure 6:
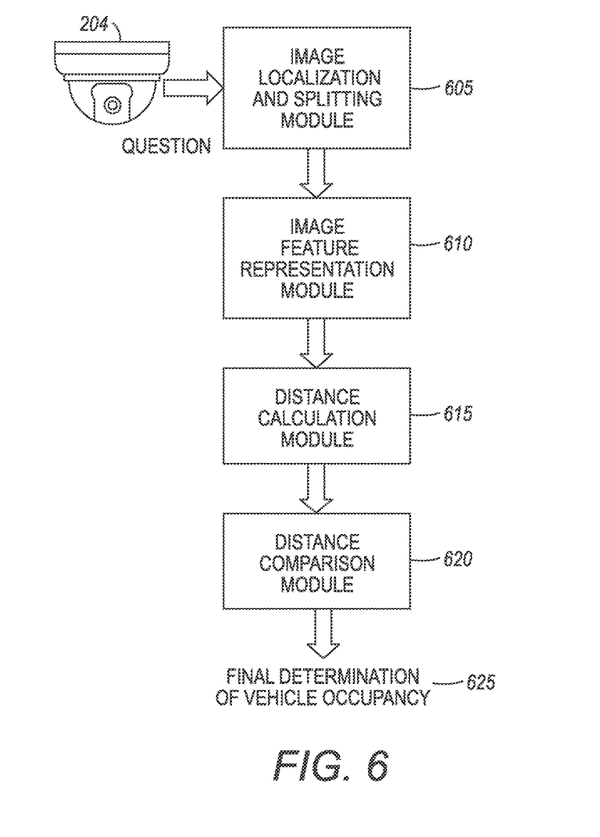
FIG. 6 depicts a block diagram of modules associated with a system and method for determining vehicle occupancy in accordance with disclosed embodiments.

FIG. 6 illustrates a block diagram of modules associated with a method and system for determining vehicle occupancy. These modules may comprise hardware and/or software associated with a computer system such as computer system 100 and can be implemented using both the computer system 100 and/or the network 200. The video acquisition module 204 is used to monitor a scene of interest. Video acquisition module 204 can be any type of video or other such surveillance device, but is preferably operating in the near infrared range. Alternatively, video acquisition module 204 can comprise previously captured video stored as data in memory such as memory 104, removable storage 112, or non-removable storage 114.

Video acquisition module 204 provides data to image localization and splitting module 605. Video image localization and splitting module 605 is used to localize the windshield region of the vehicle and split the localized windshield image into a driver side and a passenger side. The localized and split image data is then provided to image feature representation module 610. The image feature representation module is configured to determine a feature representation for each side of the localized windshield, as shown in method steps 430 and/or 525.

Once the feature representation is established for both sides of the localized windshield image, distance calculation module 615 is used to calculate the distance between the respective feature representations for each side of the windshield. The feature representation module is configured to implement method steps 435 or alternatively 530. This distance is then compared to a threshold distance as shown by, for example, step 535, by distance comparison module 620. The distance comparison module returns a final determination of vehicle occupancy 625.

Alternatively, video acquisition module 204, image localization and splitting module 605, image feature representation module 610, distance calculation module 615, and distance comparison module 620 can be used to train a classifier as illustrated in method step 410. The classifier can then be applied to real time video data wherein video acquisition module 204, image localization and splitting module 605, image feature representation module 610, distance calculation module 615, and distance comparison module 620 can be used along with the trained classifier (as shown at step 445) to determine a vehicle occupancy.

Figure 7:
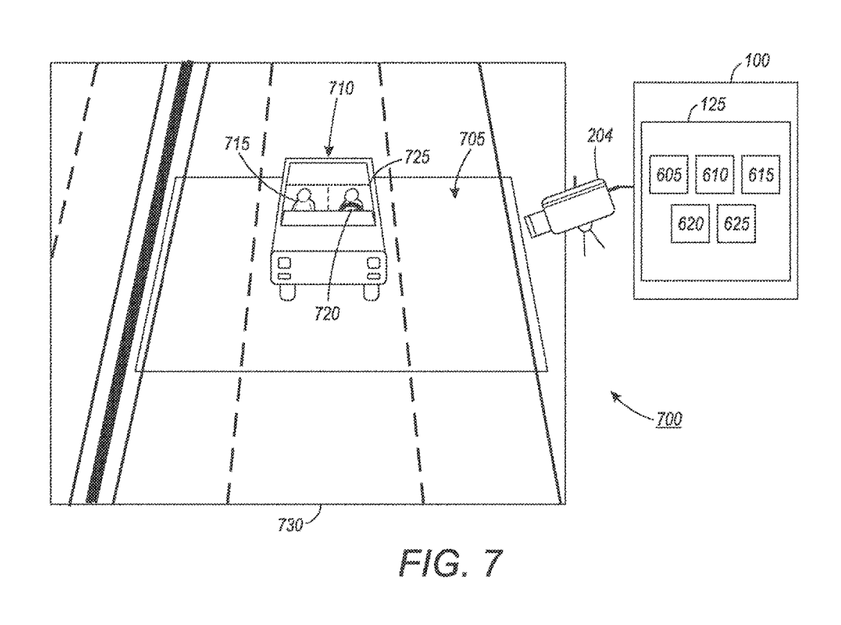
FIG. 7 depicts a system for determining vehicle occupancy in accordance with the disclosed embodiments.

FIG. 7 illustrates a system 700 for vehicle occupancy detection. In one embodiment, the system is deployed in an environment 730 such as along a street, as shown in FIG. 7. The environment 730 may also be any other environment where video surveillance is performed and preferably in an environment characterized by motion of vehicle in a HOV or HOT lane. The example of a street shown in FIG. 7 is provided solely as an example and not intended to limit the scope of the application.

Within environment 730, a vehicle 710 may be present on a roadway, a HOV lane, a HOT lane, in an intersection, in a parking facility, or any other such environment. As the vehicle 710 enters area of interest 705, video acquisition module 204, herein shown as a video camera, collects video or image data of the area of interest 705. It should be appreciated that the video or image data of the area of interest 705 may be continuously collected, or alternatively, video or image acquisition may be triggered when a vehicle enters the area of interest 705. Furthermore, video acquisition module 204 may save video data in a database and associated data structure such as a database stored in memory 104 of computer system 100.

Video camera 204 may be operably connected with a computer system 100 and/or network 200 as illustrated in FIGS. 1 and 2. In FIG. 7, computer system 100 is shown with a number of associated modules used to implement the processing steps and/or modules shown in FIGS. 4-6.

As vehicle 720 enters the area of interest 705, video camera 204 collects video data of the vehicle 720 and transmits that data to computer system 100 and to image localization and splitting module 605. Image localization and splitting module 605 is used to localize the windshield region of the vehicle 725 and split the localized windshield image into a driver side and a passenger side. In FIG. 7, vehicle 710 is shown occupied by a driver 720 and a passenger 715.

The localized and split image data is then provided to image feature representation module 610. The image feature representation module is configured to determine a feature representation for each side of the localized windshield data, as shown in method steps 430 and/or 525. Once the feature representation is established for both sides of the localized windshield image, distance calculation module 615 is used to calculate the distance between the respective feature representations for each side of the windshield. The feature representation module is configured to implement method steps 435 and/or 530. This distance is then compared to a threshold distance or uses the trained classifier, by distance comparison module 620. The distance comparison module returns a final determination of vehicle occupancy 625.

Based on the foregoing, it can be appreciated that a number of embodiments, preferred and alternative, are disclosed herein. For example, in one embodiment, a method for vehicle occupancy detection comprises collecting image data of a vehicle, creating a first value according to a plurality of characteristics of a driver position of the vehicle, creating at least one other value according to a plurality of characteristics of at least one other candidate occupant position in the vehicle, and comparing the first value to the at least one other value in order to determine a vehicle occupancy. Collecting image data of a vehicle further comprises localizing the image data of the vehicle in order to define a localized windshield region and splitting the localized windshield region into a driver part and a passenger part.

In one embodiment, the method further comprises compensating for disparities in the localized windshield region by right/left flipping at least one of the driver part and the passenger part.

In another embodiment, creating the first value according to a plurality of characteristics of a driver position of the vehicle further comprises calculating a first image feature representation vector and wherein creating at least one other value according to a plurality of characteristics of at least one other candidate occupant position in the vehicle further comprises calculating at least one other image feature representation vector.

In yet another embodiment, the method of calculating a first image feature representation vector and calculating at least one other image feature representation vector further comprises extracting a set of patches, computing a set of statistics from each of the patches, and aggregating the set of statistics from each of the patches into at least one of an image-level representation and a region level representation. Comparing the first image feature representation vector to the at least one other image feature representation vector further comprises calculating a distance between the first image feature representation vector and the at least one other image feature representation vector. In one embodiment, the distance is calculated using at least one of a Euclidean distance and a Mahalanobis distance.

In another embodiment, the method further comprises determining a threshold distance based on a set of training set of images wherein the threshold distance is indicative of a passenger in a vehicle and applying a classifier to the distance between the first image feature representation vector and the at least one other image feature representation vector in order to determine if the distance between the first image feature representation vector and the at least one other image feature representation vector is indicative of a passenger in the vehicle. The classifier can comprise one of a kernel machine and a probabilistic clustering algorithm.

In another embodiment, a method for vehicle occupancy detection comprises collecting image data of a vehicle, localizing the image data of the vehicle in order to define a localized windshield region, splitting the localized windshield region into a driver part and a passenger part, creating a first value according to a plurality of characteristics of the driver part of the vehicle by calculating a first image feature representation vector, creating at least one other value according to a plurality of characteristics of the passenger part of the vehicle by calculating at least one other image feature representation vector, and calculating a distance between the first image feature representation vector and the at least one other image feature representation vector in order to determine a vehicle occupancy.

In another embodiment, the method further comprises determining a threshold distance based on a training set of images wherein the threshold distance is indicative of a passenger in a vehicle, and applying a classifier to the distance between the first image feature representation vector and the at least one other image feature representation vector in order to determine if the distance between the first image feature representation vector and the at least one other image feature representation vector is indicative of a passenger in the vehicle.

In yet another embodiment, a system for vehicle occupancy detection comprises a camera module configured to collect image data of a vehicle, a processor, and a computer-usable medium embodying computer code, the computer-usable medium being coupled to the processor, the computer code comprising non-transitory instruction media executable by the processor. The media is configured for collecting image data of a vehicle, creating a first value according to a plurality of characteristics of a driver position of the vehicle, creating at least one other value according to a plurality of characteristics of at least one other candidate occupant position in the vehicle, and comparing the first value to the at least one other value in order to determine a vehicle occupancy.

In another embodiment, the system of collecting image data of a vehicle further comprises localizing the image data of the vehicle in order to define a localized windshield region, and splitting the localized windshield region into a driver part and a passenger part.

In another embodiment, the computer code comprising non-transitory instruction media executable by the processor is further configured for compensating for disparities in the localized windshield region by right/left flipping at least one of the driver part and the passenger part.

Creating the first value according to a plurality of characteristics of a driver position of the vehicle further comprises calculating a first image feature representation vector and creating at least one other value according to a plurality of characteristics of at least one other candidate occupant position in the vehicle further comprises calculating at least one other image feature representation vector.

In yet another embodiment, calculating a first image feature representation vector and calculating at least one other image feature representation vector further comprises extracting a set of patches, computing a set of statistics from each of the patches, and aggregating the set of statistics from each of the patches into at least one of an image-level representation and a region level representation.

In another embodiment, comparing the first image feature representation vector to the at least one other image feature representation vector further comprises calculating a distance between the first image feature representation vector and the at least one other image feature representation vector. The distance is calculated using at least one of a Euclidean distance and a Mahalanobis distance.

In one embodiment, the computer code comprising non-transitory instruction media executable by the processor is further configured for determining a threshold distance based on a training set of images wherein the threshold distance is indicative of a passenger in a vehicle and applying a classifier to the distance between the first image feature representation vector and the at least one other image feature representation vector in order to determine if the distance between the first image feature representation vector and the at least one other image feature representation vector is indicative of a passenger in the vehicle. The classifier comprises one of a kernel machine and a probabilistic clustering algorithm.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for vehicle occupancy detection comprising:
    collecting image data of a vehicle;
    creating a first value according to a plurality of characteristics of a driver position of said vehicle;
    creating at least one other value according to a plurality of characteristics of at least one other candidate occupant position in said vehicle;
    calculating a distance between said first value and said at least one other value in order to determine a vehicle occupancy;
    determining a threshold distance based on a training set of images wherein said threshold distance is indicative of a passenger in a vehicle; and
    applying a classifier to said distance between said value and said at least one other value in order to determine if said distance between said first value and said at least one other value is indicative of a passenger in said vehicle.

2. The method of claim 1 wherein collecting image data of a vehicle further comprises:
    localizing said image data of said vehicle in order to define a localized windshield region; and
    splitting said localized windshield region into a driver part and a passenger part.

3. The method of claim 2 wherein said image data of a vehicle further comprises near infrared image data of said vehicle.

4. The method of claim 2 wherein creating said first value according to a plurality of characteristics of a driver position of said vehicle further comprises calculating a first image feature representation vector; and
    wherein creating at least one other value according to a plurality of characteristics of at least one other candidate occupant position in said vehicle further comprises calculating at least one other image feature representation vector.

5. The method of claim 4 wherein calculating a first image feature representation vector and calculating at least one other image feature representation vector further comprises:
    extracting a set of patches;
    computing a set of statistics from each of said patches; and
    aggregating said set of statistics from each of said patches into at least one of an image-level representation and a region level representation.

6. The method of claim 4 wherein comparing said first image feature representation vector to said at least one other image feature representation vector further comprises calculating a distance between said first image feature representation vector and said at least one other image feature representation vector.

7. The method of claim 6 wherein said distance is calculated using at least one of:
    a Euclidean distance; and
    a Mahalanobis distance.

8. The method of claim 1 wherein said classifier comprises one of:
    a kernel machine; and
    a probabilistic clustering algorithm.

9. A method for vehicle occupancy detection comprising:
    collecting image data of a vehicle;
    localizing said image data of said vehicle in order to define a localized windshield region;
    splitting said localized windshield region into a driver part and a passenger part;

creating a first value according to a plurality of characteristics of said driver part of said vehicle by calculating a first image feature representation vector;

creating at least one other value according to a plurality of characteristics of said passenger part of said vehicle by calculating at least one other image feature representation vector;

calculating a distance between said first image feature representation vector and said at least one other image feature representation vector in order to determine a vehicle occupancy;

determining a threshold distance based on a training set of images wherein said threshold distance is indicative of a passenger in a vehicle; and applying a classifier to said distance between said first image feature representation vector and said at least one other image feature representation vector in order to determine if said distance between said first image feature representation vector and said at least one other image feature representation vector is indicative of a passenger in said vehicle.

10. A system for vehicle occupancy detection comprising:

a camera module configured to collect image data of a vehicle;

a processor; and a non-transitory computer-usable medium embodying computer code, said computer-usable medium being coupled to said processor, said computer code comprising instructions executable by said processor configured for:

collecting image data of a vehicle;

creating a first value according to a plurality of characteristics of a driver position of said vehicle;

creating at least one other value according to a plurality of characteristics of at least one other candidate occupant position in said vehicle;

calculating a distance between said first value and said at least one other value in order to determine a vehicle occupancy;

determining a threshold distance based on a training set of images wherein said threshold distance is indicative of a passenger in a vehicle; and applying a classifier to said distance between said first value and said at least one other value in order to determine if said distance between said first value and said at least one other value is indicative of a passenger in said vehicle.

11. The system of claim 10 wherein collecting image data of a vehicle further comprises:

localizing said image data of said vehicle in order to define a localized windshield region; and splitting said localized windshield region into a driver part and a passenger part.

12. The system of claim 10 wherein said image data of a vehicle further comprises near infrared image data of said vehicle.

13. The system of claim 11 wherein creating said first value according to a plurality of characteristics of a driver position of said vehicle further comprises calculating a first image feature representation vector; and wherein creating at least one other value according to a plurality of characteristics of at least one other candidate occupant position in said vehicle further comprises calculating at least one other image feature representation vector.

14. The system of claim 13 wherein calculating a first image feature representation vector and calculating at least one other image feature representation vector further comprises:

extracting a set of patches;

computing a set of statistics from each of, said patches; and aggregating said set of statistics from each of said patches into at least one of an image-level representation and a region level representation.

15. The system of claim 14 wherein comparing said first image feature representation vector to said at least one other image feature representation vector further comprises calculating a distance between said first image feature representation vector and said at least one other image feature representation vector.

16. The system of claim 15 wherein said distance is calculated using at least one of:

a Euclidean distance; and a Mahalanobis distance.

17. The system of claim 10 wherein said classifier comprises one of:

a kernel machine; and a probabilistic clustering algorithm.

* * * * *